(12) United States Patent
Curtis et al.

(10) Patent No.: US 9,098,387 B1
(45) Date of Patent: Aug. 4, 2015

(54) SYSTEM AND METHOD FOR PROVIDING A CUSTOMIZED USER EXPERIENCE BASED ON A SPEND FREQUENCY OF A USER

(71) Applicant: KABAM, INC., San Francisco, CA (US)

(72) Inventors: Matthew Curtis, Novato, CA (US); James Koh, Mountain View, CA (US); Christopher Pitz, San Francisco, CA (US); Kellen Christopher Smalley, Pleasanton, CA (US)

(73) Assignee: KABAM, INC., San Francisco, CA (US)

( * ) Notice: Subject to any disclaimer, the term of this patent is extended or adjusted under 35 U.S.C. 154(b) by 144 days.

(21) Appl. No.: 13/774,057

(22) Filed: Feb. 22, 2013

(51) Int. Cl.
*G06F 12/00* (2006.01)

(52) U.S. Cl.
CPC ...................................... *G06F 12/00* (2013.01)

(58) Field of Classification Search
USPC ....................................................... 463/16–42
See application file for complete search history.

(56) References Cited

U.S. PATENT DOCUMENTS

| | | | |
|---|---|---|---|
| 6,302,793 B1 * | 10/2001 | Fertitta et al. .................... 463/25 |
| 6,560,636 B2 | 5/2003 | Cohen et al. ................... 709/203 |
| 6,884,172 B1 | 4/2005 | Lloyd et al. ...................... 463/42 |
| 6,928,474 B2 | 8/2005 | Venkatesan .................... 709/224 |
| 7,076,453 B2 | 7/2006 | Jammes et al. .................. 705/26 |
| 7,143,054 B2 | 11/2006 | Doherty .......................... 705/10 |
| 7,533,336 B2 | 5/2009 | Jaffe et al. ...................... 715/243 |
| 7,640,300 B2 | 12/2009 | Wohlgemuth et al. ........ 709/204 |
| 7,660,740 B2 | 2/2010 | Boone et al. .................... 705/26 |
| 7,941,339 B2 | 5/2011 | Argaiz ........................ 705/14.49 |
| 8,010,657 B2 | 8/2011 | Hall et al. ...................... 709/224 |
| 8,036,930 B2 | 10/2011 | Brignull et al. ............... 705/7.33 |
| 8,105,167 B2 | 1/2012 | Mori ................................ 463/42 |
| 8,140,376 B2 | 3/2012 | Koonce et al. ................ 705/7.29 |
| 8,182,346 B2 | 5/2012 | Herrmann et al. .............. 463/42 |
| 8,226,472 B2 | 7/2012 | Van Luchene .................. 463/25 |
| 8,454,441 B2 | 6/2013 | Auterio et al. .................. 463/42 |
| 8,560,387 B2 | 10/2013 | Amidon et al. ............... 705/14.4 |
| 8,880,629 B1 | 11/2014 | Henrick et al. ............... 709/206 |
| 2005/0216338 A1 | 9/2005 | Tseng et al. .................... 705/14 |
| 2006/0073884 A1 * | 4/2006 | Walker et al. ................... 463/25 |
| 2006/0178968 A1 | 8/2006 | Jung et al. ....................... 705/35 |
| 2007/0112624 A1 | 5/2007 | Jung et al. ....................... 705/14 |
| 2007/0118420 A1 | 5/2007 | Jung et al. ....................... 705/10 |

(Continued)

OTHER PUBLICATIONS

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

(Continued)

*Primary Examiner* — Masud Ahmed

(57) ABSTRACT

One aspect of the disclosure relates to providing a customized user experience based on a spend frequency of a user in an online game. The users may be segmented based on a spend frequency associated with the user. A spend frequency may comprise an amount of purchases made by a user in a predetermined time period. The purchases made by the user in the online game may comprise purchases of virtual items made with virtual currency, purchases of real goods made with virtual currency, purchases of virtual items made with real currency, purchases of real goods made with real currency, a combination thereof, and/or other types of purchases.

19 Claims, 2 Drawing Sheets

(56) References Cited

U.S. PATENT DOCUMENTS

| | | | |
|---|---|---|---|
| 2007/0203828 A1 | 8/2007 | Jung et al. | 705/38 |
| 2007/0265091 A1 | 11/2007 | Aguilar, Jr. et al. | 463/42 |
| 2008/0009340 A1* | 1/2008 | Walker et al. | 463/25 |
| 2008/0009341 A1* | 1/2008 | Walker et al. | 463/25 |
| 2008/0091517 A1 | 4/2008 | Koonce et al. | 705/10 |
| 2008/0204448 A1 | 8/2008 | Dawson et al. | 345/419 |
| 2008/0228598 A1 | 9/2008 | Leff et al. | 705/27 |
| 2009/0124349 A1 | 5/2009 | Dawson et al. | 463/24 |
| 2009/0204907 A1 | 8/2009 | Finn et al. | 715/757 |
| 2009/0222348 A1 | 9/2009 | Ransom et al. | 705/14 |
| 2009/0248635 A1 | 10/2009 | Gross | 707/3 |
| 2010/0121808 A1 | 5/2010 | Kuhn | 706/50 |
| 2010/0131355 A1 | 5/2010 | Kitchen et al. | 705/14.43 |
| 2010/0198653 A1 | 8/2010 | Bromenshenkel et al. | 705/10 |
| 2010/0228617 A1 | 9/2010 | Ransom et al. | 705/14.25 |
| 2011/0029364 A1 | 2/2011 | Roeding et al. | 705/14.16 |
| 2011/0065490 A1 | 3/2011 | Lutnick | 463/16 |
| 2011/0082772 A1 | 4/2011 | Hirson | 705/27.1 |
| 2011/0112895 A1 | 5/2011 | Snyder | 705/14.12 |
| 2011/0153428 A1 | 6/2011 | Ramer et al. | 705/14.64 |
| 2011/0153734 A1 | 6/2011 | Kawakami et al. | 709/203 |
| 2011/0161159 A1 | 6/2011 | Tekiela et al. | 705/14.41 |
| 2011/0300923 A1 | 12/2011 | Van Luchene | 463/25 |
| 2012/0011002 A1 | 1/2012 | Crowe et al. | 705/14.66 |
| 2012/0084669 A1 | 4/2012 | Flint et al. | 715/753 |
| 2012/0101886 A1 | 4/2012 | Subramanian et al. | 705/14.23 |
| 2012/0109785 A1 | 5/2012 | Karlsson | 705/27.1 |
| 2012/0238353 A1 | 9/2012 | Herrmann et al. | 463/25 |
| 2012/0289346 A1 | 11/2012 | Van Luchene | 463/42 |
| 2013/0331179 A1 | 12/2013 | Taylor et al. | 463/29 |

OTHER PUBLICATIONS

"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshot access date May 24, 2012 2:19 PM, 1 page.

"Behavioural Analytics & Campaigning", http://lotaris.com/behavioural_analytics_and_Compaigning.htm, screenshot access date May 24, 2012 2:21 PM, 1 page.

* cited by examiner

SYSTEM AND METHOD FOR PROVIDING A CUSTOMIZED USER EXPERIENCE BASED ON A SPEND FREQUENCY OF A USER

FIELD

The disclosure relates to providing a customized user experience based on a spend frequency of a user in an online game.

BACKGROUND

Various techniques for providing a fixed set of data relating to the operation, administration, and/or performance of a virtual world are known. The display of metrics relating to a player's interaction with and performance in an online game is also known. Conventional systems, however, suffer from various drawbacks and inefficiencies relating to differentiating users in an online game or a virtual world based on frequency and amount of spending. For example, conventional systems may fail to enable the comparison, display, and differentiated treatment of users that spend in an online game at a certain frequency and amount.

SUMMARY

One aspect of the disclosure relates to providing a customized user experience based on a spend frequency of a user in an online game. The users may be segmented based on a spend frequency associated with the user. A spend frequency may comprise an amount of purchases made by a user in a predetermined time period. The purchases made by the user in the online game may comprise purchases of virtual items made with virtual currency, purchases of real goods made with virtual currency, purchases of virtual items made with real currency, purchases of real goods made with real currency, a combination thereof, and/or other types of purchases.

A system configured to facilitate providing a customized user experience based on a spend frequency of a user in an online game may include one or more processors configured to execute compute program modules. The program modules may comprise a space module, a user selection module, a customer service module, and/or other modules.

A space module may be configured to execute an instance of a virtual space, and to implement the instance of the virtual space to facilitate participation by the one or more users in the online game within the virtual space by determining view information from the instance and transmitting the view information to one or more client computing platforms associated with the one or more users that facilitate presentation of views of the virtual space to the one or more users by the one or more client computing platforms.

A user selection module may be configured to form at least a first segment of users and a second segment of users from one or more users of the online game based on a spend frequency of the one or more users of the online game.

A customer service module may be configured to provide one or more types of customer service to respective one or more segments of users. For example, the customer service module may be configured to provide a first customer service to the first segment of users and provide a second customer service different from the first customer service to the second segment of users.

In some implementations, a method of providing a customized user experience based on a spend frequency of a user in an online game may comprise: executing an instance of a virtual space; implementing the instance of the virtual space to facilitate participation by the one or more users in a game within the space by determining view information from the instance and transmitting the view information to one or more client computing platforms associated with the one or more users that facilitate presentation of views of the virtual space to the one or more users by the one or more client computing platforms; forming at least a first segment of users and a second segment of users from the one or more users based on a spend frequency of the one or more users, a spend frequency representing an amount of purchases made by a user in a predetermined time period; and providing a first customer service to the first segment of users and a second customer service different from the first customer service to the second segment of users.

In some implementations, a non-transitory electronic storage media may store information related to providing a customized user experience based on a spend frequency of a user in an online game. The stored information may comprise: a memory configured to store information related to the one or more users of an online game; and instructions configured to cause a client computing platform to: execute an instance of a virtual space; implement the instance of the virtual space to facilitate participation by the one or more users in the online game within the virtual space by determining view information from the instance and transmitting the view information to one or more client computing platforms associated with the one or more users that facilitate presentation of views of the virtual space to the one or more users by the one or more client computing platforms; form at least a first segment of users and a second segment of users from the one or more users based on a spend frequency of the one or more users, a spend frequency representing an amount of purchases made by a user in a predetermined time period; and provide a first customer service to the first segment of users and a second customer service different from the first customer service to the second segment of users.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
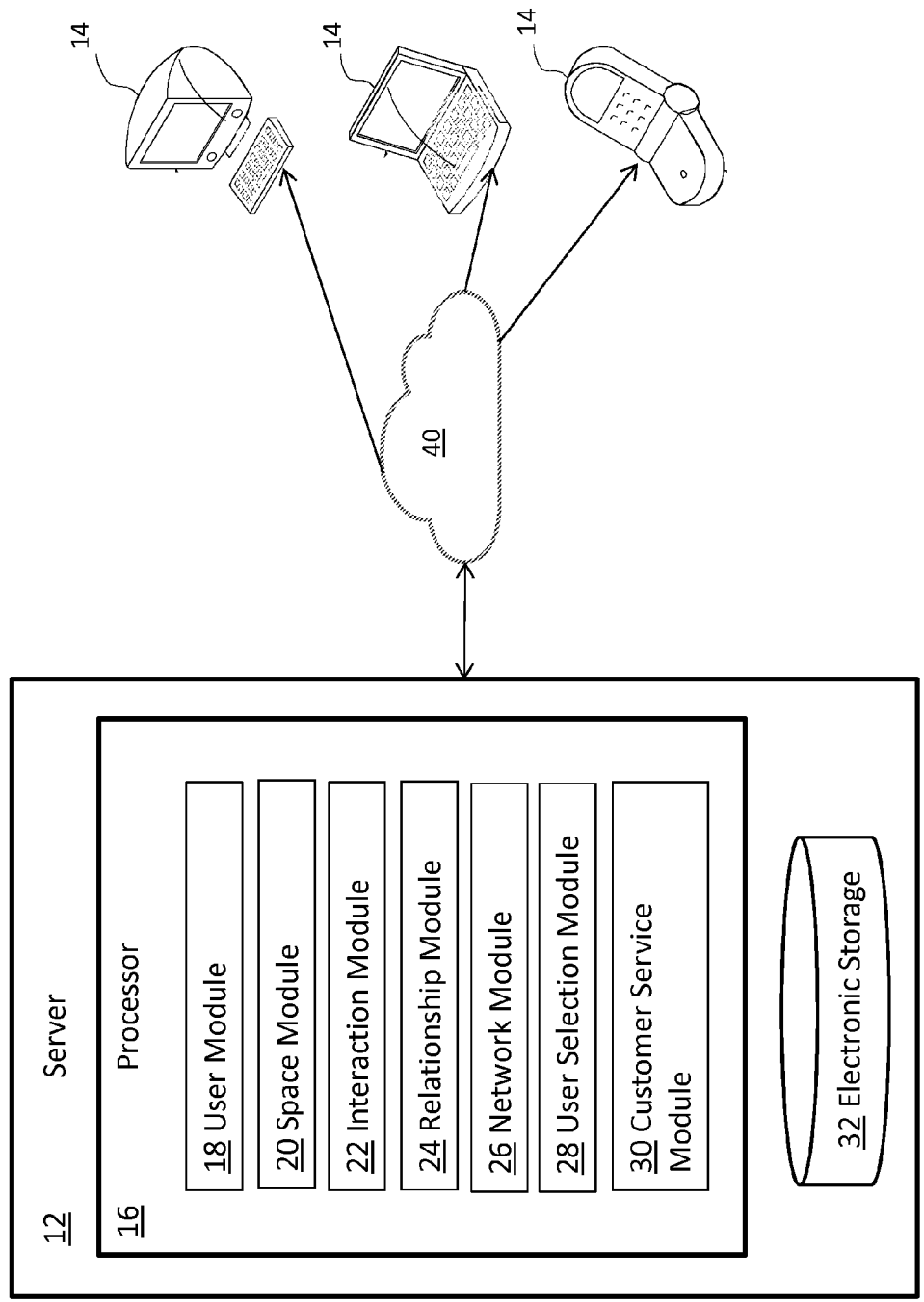
FIG. 1 illustrates an exemplary system configured to provide a customized user experience based on spend frequency of a user in an online game, according to an aspect of the invention.

FIG. 1 illustrates a system 10 configured to provide a customized user experience based on a spend frequency of a user in an online game. In some implementations, system 10 may include a game server 12. The game server 12 may host a game space in which an online game takes place. The game server 12 may be configured to communicate with one or more client computing platforms 14 according to a client/server architecture. The users may access system 10 and/or the virtual space via client computing platforms 14.

The game server 12 may be configured to execute one or more computer program modules. The computer program modules may include one or more of a user module 18, a space module 20, an interaction module 22, a relationship module 24, a network module 26, a user selection module 28, a customer service module 30, and/or other modules.

The user module 18 may be configured to access and/or manage one or more user profiles and/or user information associated with users of the system 10. The one or more user profiles and/or user information may include information stored by game server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

Space module 20 may be configured to implement the instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 20. Expressions of the instance executed on the clients may include space logic that effectively provides for execution of a limited version of the instance on a client that is synchronized and/or verified with state information received from space module 20. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 20 is not intended to be limiting. The virtual space may be presented in a more limited, or more rich, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via respective client computing platforms 14. Communications may be routed to and from the appropriate users through game server 12 (e.g., through space module 20).

The interaction module 22 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 22 in monitoring the interactions of the users may be stored to the user profiles managed by user module 18.

At a given time, interaction module 22 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 22 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The relationship module 24 may be configured to establish relationships between users within the virtual space. Such relationships may include one or more of friendships, guilds (with guild-mates), alliances, connections, followers, and/or other relationships. The relationship module 24 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships of a social construct within the virtual space that does not have a functional result.

Network module 26 of the game server 12 may be configured to maintain a connection to the one or more client computing platforms 14. For example, the network module 26 may maintain one or more communication lines or ports to enable connection and/or exchange of information with a network 40 and/or other computing platforms 14. Information such as state information, game state and game logic may be communicated via network module 26. The network module may be configured to receive information from the client computing platform 14 as well.

User selection module 28 may be configured to form at least a first segment of users and a second segment of users from the one or more users based on a spend frequency of the one or more users. As mentioned above, a spend frequency may comprise an amount of purchases made by a user in a predetermined time period. In some implementations, a spend frequency may comprise one or more purchase type frequencies. A purchase type frequency may comprise an amount of purchases of a specific type made by a user in a predetermined time period. Type of purchases made by the user in the online game may comprise purchases of virtual items made with virtual currency, purchases of real goods made with virtual currency, purchases of virtual items made with real currency, purchases of real goods made with real currency, a combination thereof, and/or other types of purchases.

Spend frequency may be calculated as a sum of all of the purchase type frequencies, as a sum of weighted purchase type frequencies, as a sum of one or more of the purchase type frequencies, and/or in other ways. In some implementations, the way in which a spend frequency is calculated may be set by the system, may be set by a system administrator and/or other user, and/or may be set in other ways. In some implementations, the way in which spend frequency is calculated may depend upon inputs received from a system administrator and/or other user of the online game. For example, one or more inputs may identify whether spend frequency is calculated as a sum of all purchase type frequencies, whether purchase type frequencies are weighted in calculation, whether one or more purchase type frequencies are not considered when calculating spend frequency, and/or other ways in which spend frequency may be calculated. User input may also provide weights to be used when determining spend frequency and/or other data values related to calculating spend frequency.

The user selection module 28 may segment one or more users of the online game into a plurality of segments based on a spend frequency of the one or more users. For example, the user selection module 28 may segment the one or more users into at least a first segment of users and a second segment of users based on whether a spend frequency of an individual user exceeds a threshold.

In some implementations, the user selection module 28 may use one or more types of thresholds to segment the one or more users. For example, the threshold may be a percentage such that each of the users of the first segment of users has a spend frequency greater than that percentage when compared with the one or more users of the online game. In another example, the threshold may be a number that represents the number of segments to be determined by the user selection module 28, such that the one or more users are grouped into the number of segments, where an equal number of users are placed in each segment based on increasing (or decreasing) respective value of spend frequency. Other types of threshold may be used as well; the types of thresholds used are not limited to the examples described herein.

For example, the user selection module 28 may use the threshold to segment the one or more users into a first segment of users with a spend frequency that is above average, greater than 90% of the one or more users of the online game, greater than 75% of the one or more users of the online game, and/or greater than another percentage of the one or more users of the online game. The user selection module 28 may use the threshold to segment the one or more users into quartiles, quintiles, and/or other segments with spend frequency values falling into equally spaced apart groups.

The type of threshold used may be a default type, may be received as an input from a system administrator and/or other user of the online game, and/or may be determined in another way. A value for the threshold may be a default value, may be received as an input from a system administrator and/or other user of the online game, may be determined by the online game based on a comparison of spend frequency across the one or more users of the game, and/or may be determined in other ways. The predetermined time period during which spend frequency is determined may be a default time period, may be received as an input from a system administrator and/or other user of the online game, may be determined by the online game based on a comparison of spend frequency during varying time periods and/or across the one or more users of the game, and/or may be determined in other ways.

In some implementations, the user selection module 28 may determine one or more segments of users from the one or more users based on a spend frequency of the one or more users and based on a spend velocity of the one or more users. A spend velocity may comprise an amount of money spent by a user in a predetermined time period. In some implementations, a spend velocity may comprise one or more velocity types. A velocity type may comprise an amount of money of a specific type spent by a user in a predetermined time period. Types of money spent by the user may comprise, for example, virtual currency, real currency, points associated with the user, and/or other types of money.

Spend velocity may be calculated as a sum of all of the velocity types, as a sum of weighted velocity types, as a sum of one or more of the velocity types, and/or in other ways. In some implementations, the way in which a spend velocity is calculated may be set by the system, may be set by a system administrator and/or other user, and/or may be set in other ways. In some implementations, the way in which spend velocity is calculated may depend upon inputs received from a system administrator and/or other user of the online game. For example, one or more inputs may identify whether spend velocity is calculated as a sum of all velocity types, whether velocity types are weighted in calculation, whether one or more velocity types are not considered when calculating spend velocity, and/or other ways in which spend velocity may be calculated. User input may also provide weights to be used when determining spend velocity and/or other data values related to calculating spend velocity.

In some implementations, the user selection module 28 may determine one or more segments of users based on a threshold associated with spend frequency and a velocity threshold associated with spend velocity. The types of velocity thresholds used to segment users based on spend velocity may be the same or similar as the types of thresholds used to segment users based on spend frequency. The ways in which the user selection module 28 may determine one or more segments of users based on spend frequency and spend velocity may be the same or similar as the ways in which the user selection module 28 determines one or more segments of users based on spend frequency. In some implementations, the user selection module 28 may determine one or more segments of users based on spend frequency, and may then determine one or more sub-segments of a segment based on spend velocity. In some implementations, the user selection module 28 may determine one or more segments of users based on spend velocity and may determine one or more sub-segments of a segment based on spend frequency. In some implementations, the user selection module 28 may determine one or more segments of users based on a combination of spend frequency and spend velocity.

In some implementations, the user selection module 28 can determine one or more segments of users from a cohort of the one or more users. The user selection module 28 may determine one or more segments of users from a cohort in a manner the same or similar to determining one or more segments of users from the one or more users of the online game.

In some implementations, the user selection module 28 may be configured to form a plurality of cohorts of users based on input received from a system administrator and/or other user of the online game. The input received may comprise a system variable. The user selection module 28 may be configured to form a plurality of cohorts of users from the one or more users of the online game based on the values relating to the system variable. A first cohort of users may comprise one or more users that share a first value relating to the system variable. A second cohort of users may comprise one or more users that share a second value relating to the system variable, where the second value may be different from the first value.

In some implementations, the first cohort of users may include some portion of the overall users having values of the system variable that correspond to each other. This may include values that are the same, values that are equal, values that fall within a specified range, values that are at least as adjacent as a threshold of some adjacency metric, and/or other values that correspond to each other. In some implementations, the user selection module 28 may form a cohort based on more than one system variable. In some examples, the user selection module 28 may be configured to identify cohorts of users that have shared an event during a time span. For example, a cohort of users may have created an account on a same day or during a same time span, may have engaged in a same or similar quest in the online game during a same time span, log in to the online game at a same time or during a same time span, make a purchase of a same or similar item at a same time or during a same time span, form a same or similar type of relationship at a same time or during a same time span, and/or share other events in common.

In some implementations, the user selection module 28 may be configured to predict a lifetime revenue associated with a user based on a spend frequency of the user. The user selection module 28 may determine spend frequency of the user over a plurality of predetermined time periods. The user selection module 28 may determine whether a trend exists regarding spend frequency of the user over the plurality of predetermined time periods. Based on the spend frequency of the user over the plurality of predetermined time periods, the user selection module 28 may predict a lifetime revenue of the user. In some implementations, the user selection module 28 may use predicted lifetime revenue of a user as a threshold by which to determine one or more segments of users. In some implementations, the user selection module 28 may determine whether a user is part of a segment of users after the user has been part of the game for at least an initial time period.

A spend frequency of a user may be determined from a purchase history of a user profile, from a history of transactions facilitated by the online game, and/or from other methods. In some implementations, an amount of a type of purchase of a spend frequency of a user may be updated. For example, a system administrator may update a spend frequency of a user. In another example, spend frequency of a user may be dynamically updated when the user makes a purchase, returns a purchase, and/or otherwise affects spend frequency.

A spend velocity of a user may be determined from a purchase history of a user profile, from a history of transactions facilitated by the online game, and/or from other methods. In some implementations, a spend velocity of a user may be updated. For example, a system administrator may update a spend velocity of a user. In another example, spend velocity of a user may be dynamically updated when the user makes a purchase, returns a purchase, and/or otherwise affects spend velocity.

Customer service module 30 may be configured to provide one or more types of customer services to a respective one or more segments of users. In some implementations, the customer service module may be configured to provide a first customer service to the first segment of users and provide a second customer service different from the first customer service to the second segment of users. Customer service may comprise one or more of: provision of an offer, instantiation of a buff, provision of bonus levels, making one or more types of goods available for purchase, making one or more goods available for purchase, providing access to one or more locations in the virtual space, and/or other types of customer service. For example, customer service module 30 may provide a first offer to the first segment of users and a second offer different from the first offer to the second segment of users. In another example, the customer service module 30 may provide a virtual item for sale at a first price to the first segment of users and at a second price to the second segment of users. In yet another example, the customer service module 30 may provide access to a location in the online game to the first segment of users, but may not provide access to that location to the second segment of users.

In some implementations, the customer service module 30 may conduct A/B testing across the one or more segments of users. For example, the customer service module 30 may conduct A/B testing of different products at different prices across the one or more segments of users.

The game server 12, client computing platforms 14, and/or external resources may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game servers 12, client computing platforms 14, and/or external resources may be operatively linked via some other communication media.

Game server 12 may include electronic storage 32, one or more processors 16, and/or other components. Game server 12 may include communication lines, or ports to enable the exchange of information with a network 46 and/or other computing platforms 14. Illustration of game server 12 in FIG. 1 is not intended to be limiting. Game server 12 may include a plurality of hardware, software, and/or firmware components operating together to provide the functionality attributed herein to game server 12. For example, game server 12 may be implemented by a cloud of computing platforms operating together as game server 12.

Electronic storage 32 may comprise non-transitory storage media that electronically stores information. The electronic storage media of electronic storage 32 may include one or both of system storage that is provided integrally (i.e., substantially non-removable) with game server 12 and/or removable storage that is removably connectable to game server 12 via, for example, a port (e.g., a USB port, a firewire port, etc.) or a drive (e.g., a disk drive, etc.). Electronic storage 32 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 32 may include one or more virtual storage resources (e.g., cloud storage, a virtual private network, and/or other virtual storage resources). Electronic storage 32 may store software algorithms, information determined by processor 16, information received from game server 12, information received from client computing platforms 14, and/or other information that enables game server 12 to function as described herein.

Processor(s) 16 is configured to provide information processing capabilities in game server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, 26, 28, and 30. Processor 16 may be configured to execute modules 18, 20, 22, 24, 26, 28, and 30 by software; hardware; firmware; some combination of software, hardware, and/or firmware; and/or other mechanisms for configuring processing capabilities on processor 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, 26, 28, and 30 are illustrated in FIG. 1 as being implemented within a single processing unit, in implementations in which processor includes multiple processing units, one or more of modules 18, 20, 22, 24, 26, 28, and 30 may be implemented remotely from the other modules. The description of the functionality provided by the different modules 18, 20, 22, 24, 26, 28, and 30 28 described below is for illustrative purposes, and is not intended to be limiting, as any of modules 18, 20, 22, 24, 26, 28, and 30 may provide more or less functionality than is described. For example, one or more of modules 18, 20, 22, 24, 26, 28, and 30 may be eliminated, and some or all of its functionality may be provided by other ones of modules 18, 20, 22, 24, 26, 28, and 30. As another example, processor 16 may be configured to execute one or more additional modules that may perform some or all of the functionality attributed below to one of modules 18, 20, 22, 24, 26, 28, and 30.

A given client computing platform 14 may include one or more processors configured to execute computer program modules. The computer program modules may be configured to enable an expert or user associated with the given client computing platform 14 to interface with system 10, game server 12, and/or external resources, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Figure 2:
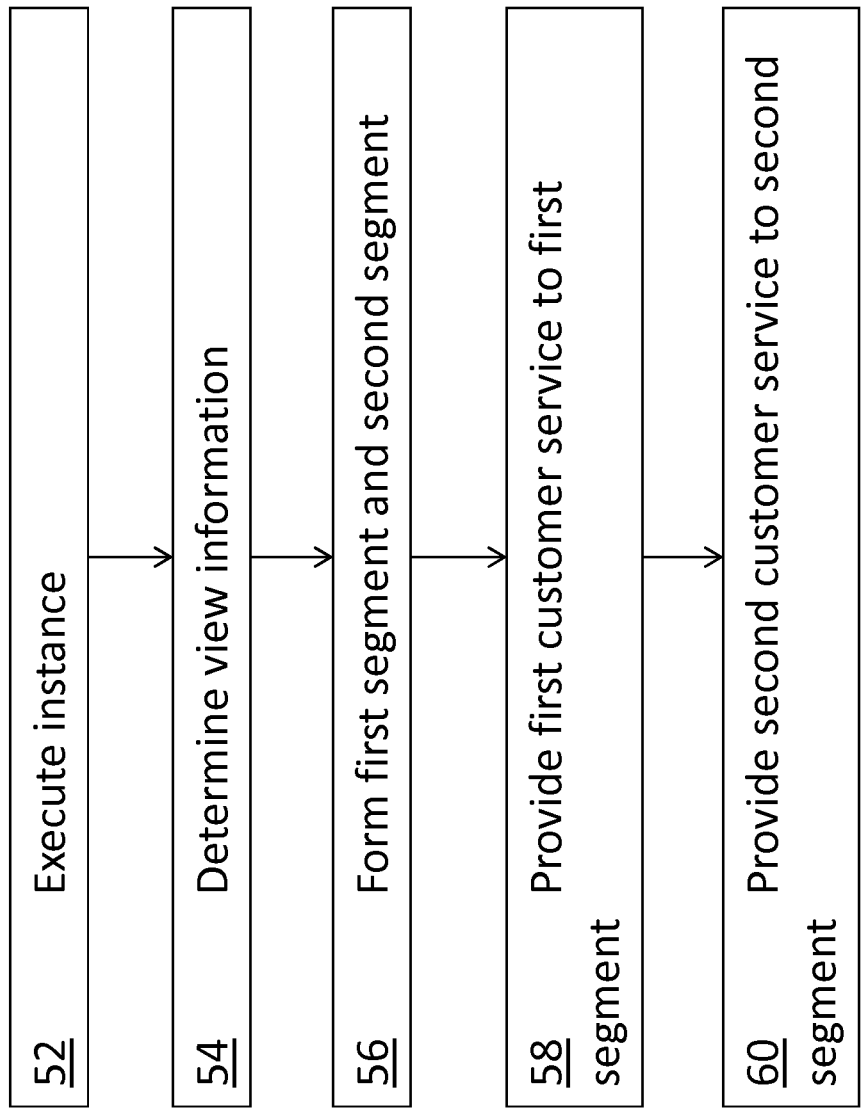
FIG. 2 illustrates an exemplary method of providing a customized user experience based on spend frequency of a user in an online game, according to an aspect of the invention.

FIG. 2 illustrates a method 50 of providing a customized user experience based on a spend frequency of a user in an online game. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 2 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a space module the same as or similar to space module 20 (shown in FIG. 1 and described above).

At an operation 54, the executed instance of the virtual space may be implemented to determine view information. The view information may define views to be presented to users via client computing platforms. In some implementations, operation 54 may be performed by a space module the same as or similar to space module 20 (shown in FIG. 1 and described above).

At an operation 56, a first segment of users and a second segment of users from the one or more users of the online game may be formed based on a spend frequency of the one or more users. In some implementations, operation 56 may be performed by a user selection module the same as or similar to user selection module 28 (shown in FIG. 1 and described above).

At an operation 58, a first customer service may be provided to the first segment of users. In some implementations, operation 58 may be performed by a customer service module the same as or similar to customer service module 30 (shown in FIG. 1 and described above).

At an operation 60, a second customer service may be provided to the second segment of users. In some implementations, operation 60 may be performed by a customer service module the same as or similar to customer service module 30 (shown in FIG. 1 and described above).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A computer-implemented method of providing a customized user experience based on a spend frequency of a user in an online game, the method being implemented in a computer system comprising one or more physical processors, the method comprising:

executing, by the one or more processors, an instance of an online game that takes place within a virtual space;

implementing, by the one or more processors, the instance of the online game in the virtual space to facilitate participation by the one or more users in the online game by determining view information from the instance and transmitting the view information to one or more client computing platforms associated with the one or more users that facilitate presentation of views of the online game to the one or more users by the one or more client computing platforms;

implementing, by the one or more processors, in-game actions in the expression of the online game in response to action requests for the in-game actions from the one or more users entered and/or selected by users through the one or more client computing platforms associated with the one or more users, wherein the in-game actions control one or more in-game objects in the online game;

providing, by the one or more processors, offers to the one or more users of the online game for the purchase of virtual items usable by the one or more users in the online game, wherein the use of the virtual items included in the offers is optional;

forming, by the one or more processors, at least a first segment of users and a second segment of users from the one or more users based on a spend frequency of the one or more users on the offers for the purchase of virtual items, a spend frequency representing an amount of transactions, comprising purchases of virtual items, made by a user in a predetermined time period within the virtual space; and providing, by the one or more processors, a first customer service to the first segment of users and a second customer service different from the first customer service to the second segment of users, wherein the customer services comprise provision of additional game content to the one or more users.

2. The method of claim 1, wherein customer services comprises one or more of: provision of an offer, instantiation of a buff, provision of bonus levels, types of goods available for purchase, or access to one or more locations in the virtual space.

3. The method of claim 1, wherein the first customer service comprises provision of a first offer and the second customer service comprises provision of a second offer different from the first offer.

4. The method of claim 1, wherein the first customer service comprises providing a virtual item for sale to the first segment of users at a first price and the second customer service comprises providing the virtual item for sale to the second segment of users at a second price different from the first price.

5. The method of claim 1, wherein the first segment of users comprises one or more users with a spend frequency above a predetermined threshold.

6. The method of claim 1, wherein providing the first customer service to the first segment of users comprises:

providing the first customer service to one or more cohorts associated with the first segment of users.

7. The method of claim 1, wherein forming at least the first segment of users and the second segment of users from the one or more users comprises:

forming at least the first segment of users and the second segment of users based on the spend frequency of the one or more users and based on a spend velocity of the one or more users, the spend velocity comprising an amount of money spent by a user in the predetermined time period.

8. The method of claim 1, further comprising:

predicting a lifetime revenue of a user of the one or more users based on a spend frequency of the user.

9. The method of claim 1, further comprising:

receiving first feature input regarding a selection of a first feature by which to compare the first segment of users and the second segment of users;

receiving second feature input regarding a selection of a second feature by which to compare the first segment of users and the second segment of users; and displaying a comparison of the first segment of users and the second segment over users based on the first feature and the second feature.

10. A system configured to facilitate providing a customized user experience based on a spend frequency of a user in an online game, the system comprising:
one or more processors configured to execute compute program modules, the computer program modules comprising:
a space module configured to:
execute an instance of a non-wagering online game that takes place within a virtual space,
implement the instance of the online game to facilitate participation by the one or more users in the online game within the virtual space by determining view information from the instance and transmitting the view information to one or more client computing platforms associated with the one or more users that facilitate presentation of views of the online game to the one or more users by the one or more client computing platforms, and,
implement in-game actions in the expression of the game in response to action requests for the in-game actions from the one or more users entered and/or selected by users through the one or more client computing platforms associated with the one or more users, wherein the in-game actions control one or more in-game objects in the online game;
an offer module configured to provide offers to the one or more users of the online game for the purchase of virtual items usable by the one or more users in the online game, wherein the use of the virtual items included in the offers is optional;
a user selection module configured to form at least a first segment of users and a second segment of users from the one or more users based on a spend frequency of the one or more users on offers for the purchase of virtual items, a spend frequency representing an amount of transactions, comprising purchases of virtual items, made by a user in a predetermined time period within the virtual space; and
a customer service module configured to:
provide a first customer service to the first segment of users; and
provide a second customer service different from the first customer service to the second segment of users, wherein the customer services comprise provision of additional game content to the one or more users.

11. The system of claim 10, wherein customer services comprises one or more of: provision of an offer, instantiation of a buff, provision of bonus levels, types of goods available for purchase, or access to one or more locations in the virtual space.

12. The system of claim 10, wherein the first customer service module is configured to:
provide the first customer service to the first segment of users by providing a first offer to the first segment of users; and
provide the second customer service to the second segment of users by providing a second offer different from the first offer.

13. The system of claim 10, wherein the first customer service module is configured to:
provide the first customer service to the first segment of users by providing a virtual item for sale to the first segment of users at a first price; and
provide the second customer service to the second segment of users by providing the virtual item for sale to the second segment of users at a second price different from the first price.

14. The system of claim 10, wherein the user selection module is configured to:
form the first segment of users based on a spend frequency of the one or more users, wherein the spend frequency of the one or more users of the first segment is above a predetermined threshold.

15. The system of claim 10, wherein the first customer service module is configured to:
provide the first customer service to the first segment of users by providing the first customer service to one or more cohorts associated with the first segment of users.

16. The system of claim 10, wherein the user selection module is configured to:
form at least the first segment of users and the second segment of users based on the spend frequency of the one or more users and based on a spend velocity of the one or more users, the spend velocity comprising an amount of money spent by a user in the predetermined time period.

17. The system of claim 10, further comprising:
a prediction module configured to predict a lifetime revenue of a user of the one or more users based on a spend frequency of the user.

18. The system of claim 10, further comprising:
a comparison module configured to:
receive first feature input regarding a selection of a first feature by which to compare the first segment of users and the second segment of users;
receive second feature input regarding a selection of a second feature by which to compare the first segment of users and the second segment of users; and
display a comparison of the first segment of users and the second segment over users based on the first feature and the second feature.

19. A non-transitory electronic storage media storing information related to providing a customized user experience based on a spend frequency of a user in an online game, the stored information comprising:
a memory configured to store information related to the one or more users of an online game; and
instructions configured to cause a client computing platform to:
execute an instance of a non-wagering online game that takes place within a virtual space;
implement the instance of the online game to facilitate participation by the one or more users in the online game within the virtual space by determining view information from the instance and transmitting the view information to one or more client computing platforms associated with the one or more users that facilitate presentation of views of the online game to the one or more users by the one or more client computing platforms;
implement in-game actions in the expression of the online game in response to action requests for the in-game actions from the one or more users entered and/or selected by users through the one or more client computing platforms associated with the one or more users, wherein the in-game actions control one or more in-game objects in the online game;
provide offers to the one or more users of the online game for the purchase of virtual items usable by the one or more users in the online game, wherein the use of the virtual items included in the offers is optional;

form at least a first segment of users and a second segment of users from the one or more users based on a spend frequency of the one or more users on the offers for the purchase of virtual items, a spend frequency representing an amount of transactions, comprising purchases of virtual items, made by a user in a predetermined time period within the virtual space; and provide a first customer service to the first segment of users and a second customer service different from the first customer service to the second segment of users, wherein the customer services comprise provision of additional game content to the one or more users.

* * * * *